(12) United States Patent
Casado-Montero et al.

(10) Patent No.: US 11,167,854 B2
(45) Date of Patent: Nov. 9, 2021

(54) AIRCRAFT INCORPORATING A POWER UNIT FOR GENERATING ELECTRIC, PNEUMATIC AND/OR HYDRAULIC POWER

(71) Applicant: AIRBUS OPERATIONS, S.L., Getafe (ES)

(72) Inventors: Carlos Casado-Montero, Getafe (ES); Alberto Molina Parga, Getafe (ES)

(*) Notice: Subject to any disclaimer, the term of this patent is extended or adjusted under 35 U.S.C. 154(b) by 494 days.

(21) Appl. No.: 15/997,005

(22) Filed: Jun. 4, 2018

(65) Prior Publication Data

US 2018/0346132 A1    Dec. 6, 2018

(30) Foreign Application Priority Data

Jun. 6, 2017  (EP) ...................................... 17382337

(51) Int. Cl.
*B64D 13/08* (2006.01)
*B64D 33/02* (2006.01)
(Continued)

(52) U.S. Cl.
CPC ............. *B64D 13/08* (2013.01); *B64D 13/06* (2013.01); *B64D 33/02* (2013.01); *B64D 41/00* (2013.01);
(Continued)

(58) Field of Classification Search
CPC ...... F02C 1/05; F02C 1/10; F02C 6/08; F02C 6/18; F02C 7/143; F02C 7/18; F02C 9/18;
(Continued)

(56) References Cited

U.S. PATENT DOCUMENTS 3,063,661 A  *  11/1962  Smith ....................... F02K 3/04
                                                              244/54
4,178,754 A  *  12/1979  Earnest ................... F01K 23/10
                                                              60/39.181
(Continued)

FOREIGN PATENT DOCUMENTS

DE         3509767 A1    1/1986
EP         3029281 A1    6/2016

OTHER PUBLICATIONS

European Search Report dated Nov. 21, 2017 in European Patent Application No. EP17382337.

*Primary Examiner* — Jason H Duger
(74) *Attorney, Agent, or Firm* — Dickinson Wright PLLC

(57) ABSTRACT

The invention relates to an aircraft incorporating an enhanced power unit for generating electric, pneumatic and/or hydraulic power for the aircraft during all stages of the aircraft operation. The power unit (1) comprises: a heat engine (14) with a drive shaft (2) and a combustion gases exhaust (7). The power unit (1) also includes a Rankine cycle system (12) for recovering thermal energy from a heat source of the power unit (1) for the assistance of the heat engine (14). The heat source for the Rankine cycle system can be taken from the exhaust gases of the heat engine, from the oil coolant circuit of the heat engine or from the output of a compressor driven by the heat engine. Preferably, the aircraft cabin air is reused as a source of oxygen for the combustion. The invention reduces bleed air extraction from the aircraft main engines thereby reducing fuel consumption.

15 Claims, 5 Drawing Sheets

(51) Int. Cl.
  *B64D 41/00* (2006.01)
  *B64D 13/06* (2006.01)
(52) U.S. Cl.
  CPC ............. *B64D 2013/0611* (2013.01); *B64D 2013/0644* (2013.01); *B64D 2013/0648* (2013.01); *B64D 2013/0666* (2013.01); *B64D 2013/0696* (2013.01); *B64D 2033/0213* (2013.01); *B64D 2041/002* (2013.01)
(58) Field of Classification Search
  CPC ........ B64D 13/06; B64D 13/08; B64D 33/02; B64D 41/00; B64D 2013/0611; B64D 2013/0618; B64D 2013/0644; B64D 2013/0648; B64D 2013/0696; B64D 2013/0666; B64D 2013/0688; B64D 2033/0213; B64D 2041/002
  See application file for complete search history.

(56) References Cited

U.S. PATENT DOCUMENTS

| | | | |
|---|---|---|---|
| 6,283,410 B1* | 9/2001 | Thompson | B64D 41/00 244/59 |
| 6,796,527 B1 | 9/2004 | Munoz et al. | |
| 8,302,399 B1* | 11/2012 | Freund | F02G 5/00 60/605.1 |
| 8,657,227 B1 | 2/2014 | Bayliss et al. | |
| 9,302,775 B2* | 4/2016 | Houssaye | B64C 13/06 |
| 9,410,478 B2* | 8/2016 | Loebig | F02C 7/143 |
| 10,329,023 B2* | 6/2019 | Parmentier | F04D 29/563 |
| 2010/0083632 A1 | 4/2010 | Foster et al. | |
| 2015/0047684 A1 | 2/2015 | Mitchell et al. | |
| 2016/0152341 A1* | 6/2016 | Hotzeldt | B64D 27/16 244/15 |
| 2017/0292447 A1* | 10/2017 | Himmelmann | F01K 23/10 |
| 2018/0058330 A1* | 3/2018 | Munevar | F02K 3/06 |

* cited by examiner

AIRCRAFT INCORPORATING A POWER UNIT FOR GENERATING ELECTRIC, PNEUMATIC AND/OR HYDRAULIC POWER

CROSS-REFERENCE TO RELATED APPLICATIONS

This application claims the benefit and priority of EP 17382337.8, filed Jun. 6, 2017. The entire disclosure of the above application is incorporated herein by reference.

DESCRIPTION

Object of the Invention

The invention relates to an aircraft incorporating an enhanced power unit configured to generate electric, pneumatic and/or hydraulic power for the aircraft, during all stages of the aircraft operation.

An object of the invention is to provide an enhanced power unit for an aircraft capable of recovering thermal energy as mechanical energy, in order to downsize equipment and to reduce the amount of bleed air extracted from the aircraft main engines, thereby reducing fuel consumption.

Background of the Invention

Several systems of commercial aircraft require the extraction of air, called bleed air, from one of the compression stages of the main engines, for example the wing de-icing systems or the air conditioning system for the aircraft cabin, require bleed air in the form of hot compressed air that is taken from a compressor stage of the main engines of the aircraft. Alternatively, bleed air is provided by a compressor driven by a gas turbine of an Auxiliary Power Unit (APU) when the aircraft is on the ground and the main engines are stopped.

The extraction of bleed air from one of the compression stages of the main engines, implies a small percentage of block fuel in normal cycle, therefore it is desirable to avoid or reduce the amount of air extracted from the main engines.

Commonly an aircraft integrates air conditioning systems for supplying conditioned air with a desired temperature and pressure to a pressurized cabin.

The air conditioning system, in addition to regulating temperature and pressure of cabin air, also serves to control the cabin humidity and to supply oxygen to the cabin. Excess cabin pressurized air is expelled out of the cabin and wasted.

An environmental control system (ECS) of an aircraft, is the main equipment of the air conditioning system for the aircraft cabin, and it is generally formed by a turbine driven by bleed air taken from a main engine, such as the turbine power is transmitted to a compressor connected to a common shaft. The engine bleed air to be supplied to the turbine, is compressed by the compressor and then supplied to a pressurized cabin.

Such conventional air-conditioning systems operate at high pressure and temperature levels, for example the extracted bleed air is typically at 200° C.

These air-conditioning systems usually require "Ram air" as a heat sink, so that the bleed air used for the air-conditioning is cooled by means of this Ram air, as well as compression, intermediate cooling and expansion of the bleed air. However, Ram doors when deployed to supply the Ram air, normally results in an increase of drag that can vary depending on the need of cooling air.

On the other hand, an APU comprises a gas turbine, a pneumatic compressor, one or more electrical generators, and/or hydraulic pumps, and/or a pneumatic compressor, a gearbox and one or several electric generators, in order to provide electric, and/or pneumatic and/or hydraulic power. The main use of an APU is when the aircraft is on the ground and the main engines are stopped, thus they cannot provide the aircraft with electric, pneumatic or hydraulic external power necessary during flight. During flight, the APU normally is not used, and the hydraulic and electric supplies as well as the bleed air, are provided by the main engines.

There is still room for improving the efficiency of thermal systems, in order to design more efficient aircrafts that reduce fuel consumption.

SUMMARY OF THE INVENTION

The present invention relates to an aircraft incorporating an enhanced power unit capable of generating electric, pneumatic and/or hydraulic power for the aircraft during all stages of flight and while grounded. The power unit comprises any type of heat engine, preferably a gas-turbine or a reciprocating engine, having at least one drive shaft and an exhaust for evacuating combustion gases out of the heat engine.

The power unit incorporates a Rankine cycle system for recovering thermal energy from a heat source, and converting the recovered energy to mechanical energy that is applied to the drive shaft for the assistance of the heat engine, so that, the heat engine can be downsized, and as consequence the weight and fuel consumption of the aircraft, are reduced. Downsizing the heat engine greatly compensates for the increase of weight due to the incorporation of the Rankine cycle components, and the reduced volume of the heat engine allows its installation in an existing compartment of the aircraft, for example at the tail cone.

The heat source for the Rankine cycle system can be taken from the exhaust gases of the heat engine, from the oil coolant circuit of the heat engine or from the output of a compressor driven by the heat engine.

Preferably, the aircraft cabin is in communication with the heat engine for feeding cabin air to the heat engine, so that excess cabin air is reused as a source of oxygen for the combustion at the heat engine.

The cabin air feed to the heat engine allows the Main Engine cycle to achieve an efficiency around 45%. At the same time, it increases the power offtake in altitude allowing one to downsize the APU by around 40%. Additionally, it makes the power offtake non-sensitive to the altitude and ambient conditions, i.e. no icing issues, and it does not create additional drag on the aircraft.

Preferably, the power unit further comprises at least one electric generator driven by the drive shaft for generating electric power, and at least one battery connected with the electric generator for storing the generated electric power.

Preferably, the power unit comprises: at least one load compressor mechanically coupled with the drive shaft to provide pneumatic power which is supplied to an environmental control system (ECS) of the aircraft.

For generating hydraulic power for the aircraft, a hydraulic pump can additionally be coupled with the drive shaft.

Unlike prior art APU's that only operate when the aircraft is on the ground or in emergency situations in flight to be able to deliver partial power supply, either pneumatic or electrical or both, the power unit of the present invention is adapted to operate in all stages of an aircraft operation, namely: parked, taxiing, climbing, cruising, descending and landing.

The power unit of the present invention provides a significant part of the aircraft power demands either electrical or pneumatic or hydraulic, at least during normal operation, so that the amount of bleed air or electrical power extracted from the main engines is significantly reduced or even avoided, achieving thereby a significant block fuel savings.

BRIEF DESCRIPTION OF THE DRAWINGS

Preferred embodiments of the invention, are henceforth described with reference to the accompanying drawings, wherein.

PREFERRED EMBODIMENT OF THE INVENTION

Figure 1:
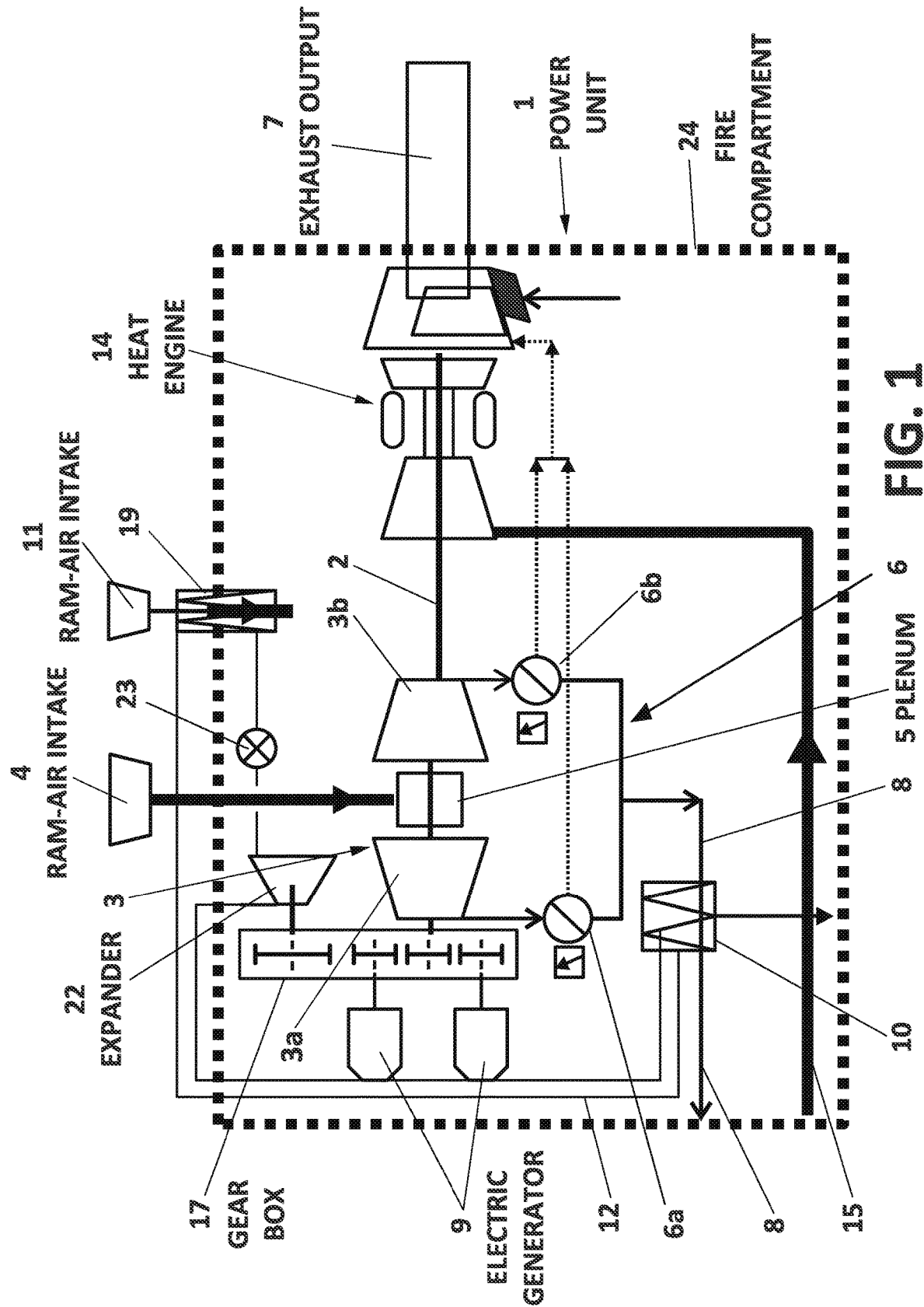
FIG. 1 is a schematic representation of an embodiment of a power unit in accordance with the present invention

FIG. 1 shows a preferred embodiment of a power unit (1) according to the invention comprising a heat engine (14), in this example a gas-turbine engine (14) coupled with a drive shaft (2) and a twin-load compressor (3) including first and second load compressors (3a, 3b) both mechanically coupled with the drive shaft (2) to provide respectively two flows of compressed air. Preferably, the gas-turbine engine (14) has only one drive shaft (2), but an engine with two drive shafts could also be used.

Preferably, the first and second load compressors (3a, 3b) are provided with air lubricated bearings, in order to prevent any oil contamination in the cabin.

In order to achieve a higher block fuel reduction, one of the load compressors (3a, 3b) is sized for ground operation. Usually the corrected flow needed for ground operation represents half of the total corrected flow needed in flight, based on that fact the preferred solution is to choose a twin load compressor configuration, face to face arranged and fed by a single air inlet, it means that two identical compressors are preferred. In a case wherein the ground to flight flow ratio differs, two different compressor sizings would be chosen.

A Ram-air intake (4) is in fluid communication with the twin-load compressor (3) to feed Ram air to the first and second load compressors (3a, 3b), in particular the Ram-air intake (4) is connected with a plenum (5) which reduces speed and distributes Ram air to both compressors (3a, 3b).

Flow regulating means (6) are coupled with the first and second load compressors (3a, 3b) outputs to individually regulate the two flows of the generated compressed air. More specifically, these flow regulating means (6) comprise a first three-way valve (6a) having one input connected with first compressor output (3a), and a second three-way valve (6b) having one input connected with the second compressor output (3b).

These three-way valves (6a, 6b) can be used to avoid reverse flow, so that when both compressors (3a, 3b) are working they provide the same pressure so that none of them go on surge. When only one of the compressors (3a, 3b) is working to provide air flow to the aircraft the non-operative compressor (3a, 3b) is isolated by closing its associated three-way valve (6a, 6b), and when the two compressors (3a, 3b) are stopped, they are isolated by closing the three-way valves (6a, 6b).

The flow regulating means (6) also comprises inlet guide vanes (IGV's) (not shown) for each compressor (3a, 3b), to regulate individually air flow through the compressors (3a, 3b).

Alternatively or in combination with the IGV's, the output of compressed air can be regulated by varying the rotation speed of the heat engine (14).

One output of each of the first and second three-way valves (6a, 6b) are connected with the exhaust output (7) to evacuate excess of air to the exterior, and another output of each of the first and the second three-way valves (6a, 6b) are connected to a general output (8) which is in communication with an environmental control system (ECS) (not shown) of the aircraft.

The power unit (1) additionally comprises at least one electric generator (9) operatively coupled with the drive shaft (2) through a gear box (17), to provide electric power to the aircraft, which can be stored in a battery (25) which in turn is connected to an electric system of the aircraft.

The power unit (1) further comprises a Rankine cycle system for recovering thermal energy as mechanical energy to be added to the mechanical power generated by the gas-turbine engine (14). The Rankine cycle system comprises a closed circuit (12) through which a working fluid can flow, an expander (22) mechanically coupled with the drive shaft (2) through the gear box (17), a Ram-air intake (11) and a condenser (19) thermally coupled with the Ram-air intake (11) to cool down the working fluid. The Rankine cycle circuit (12) also includes a heat exchanger (10) thermally coupled with a heat source of the power unit (1).

Figure 2:
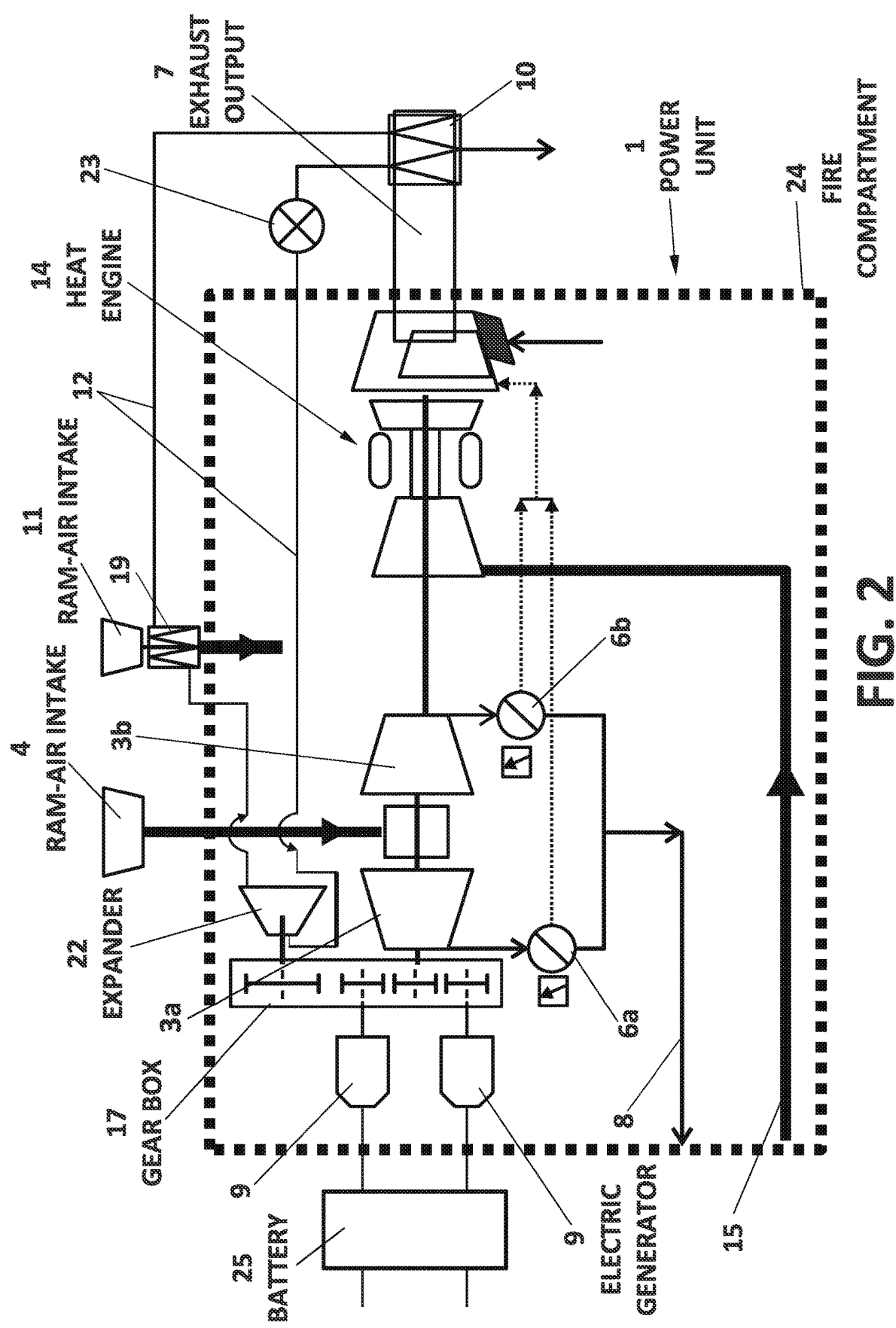
FIG. 2 is a schematic representation of a modification of the embodiment shown in FIG. 1.

In the embodiment of FIG. 1, the heat source is the output (8) of the flow regulating means (6) so that, the heat exchanger (10) is coupled with the output (8), and in the embodiment of FIG. 2 the heat source is the exhaust output (7) of the gas-turbine (14), so that, the heat exchanger (10) is coupled with the exhaust output (7). A pump (23) is installed at the circuit (12) to increase pressure of the working fluid flowing through the circuit (12).

As shown in FIGS. 1 and 2, the aircraft cabin is in communication with the gas-turbine (14) by means of a conduit (15) so that, instead of using Ram air, excess cabin air is reused for the gas-turbine combustion.

In the embodiment of FIG. 1, the heat of the air at the output (8) is transferred to the working fluid of the Rankine circuit (12), so that that flow of air is cooled down before being fed to the aircraft ECS's. In the Rankine circuit (12), the working fluid at high pressure and temperature, is expanded at the expander (22) generating thereby a mechanical power which is applied to the drive shaft (2) of the gas-turbine (14), so that a gas-turbine (14) of reduced dimension can be used.

After the expander (22) the working fluid is cooled down at the condenser (19), by exchanging heat with the cold Ram air received from the Ram-air intake (11). From the condenser (19), the working fluid flows back towards the heat exchanger (10). The air flow used for the condenser should be extracted out through the exhaust (7).

The embodiment of FIG. 2 is similar to the previous embodiment shown in FIG. 1; however the heat exchanger (10) is installed at the gas-turbine exhaust (7), so that in this case thermal energy is recovered from combustion gases expelled from the gas-turbine (14). A battery (25) is provided for storing electric energy generated by the electric generators (9).

Figure 3:
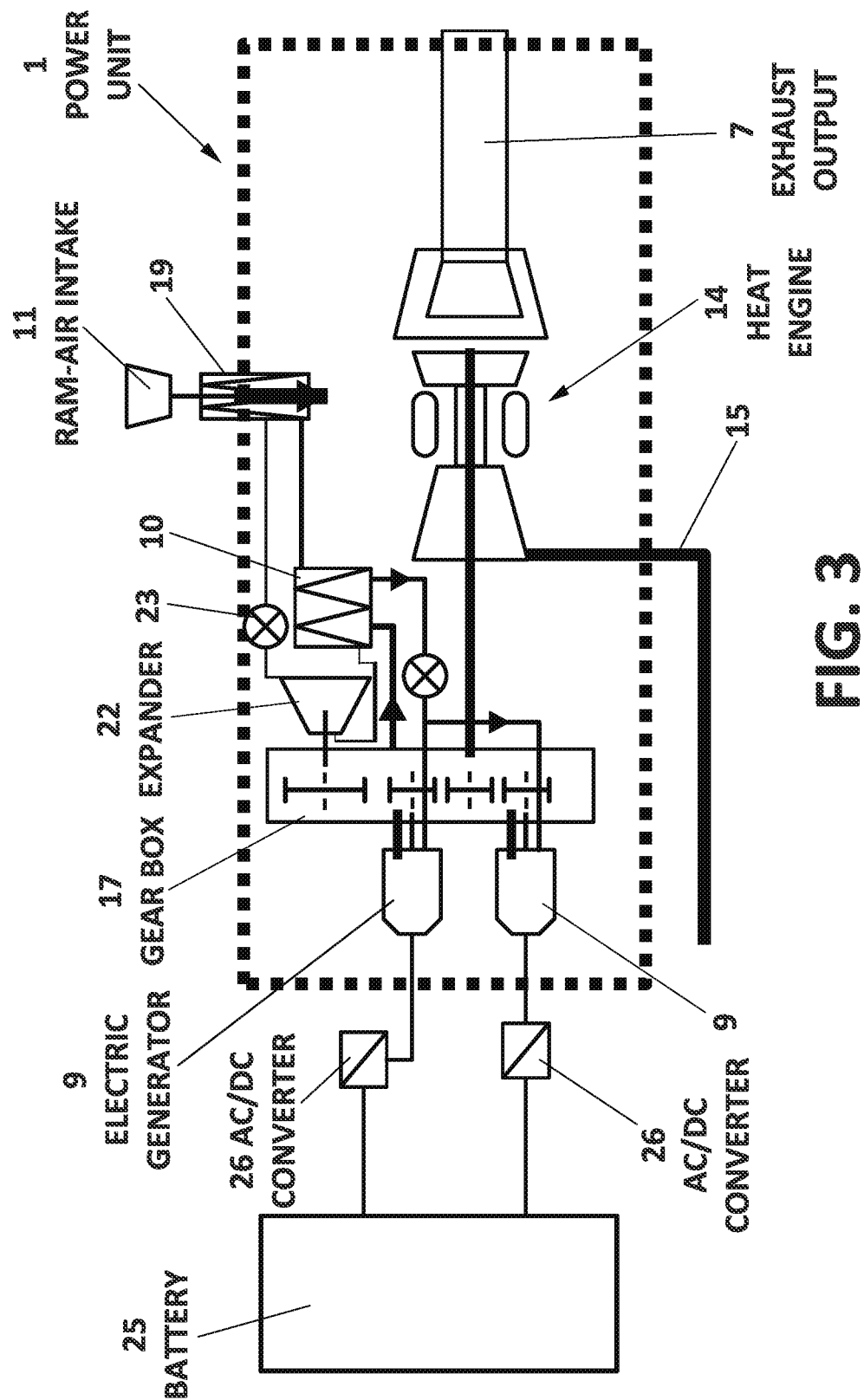
FIG. 3 is a schematic representation of an alternative embodiment of the design shown in FIG. 1.

The embodiment of FIG. 3 corresponds to a purely electric architecture in accordance with the present invention. The embodiment is similar to the previous embodiments of FIGS. 1 and 2, but there are no load compressors in this embodiment, only AC electric generators (9) that load a battery (25) through AC/DC converters (26).

Alternatively, in other preferred embodiments of the invention, there are no batteries, and the AC electric generators (9) directly feed the aircraft electric system with AC current.

In this embodiment, the heat source for the Rankine cycle system is the heat generated by the gas-turbine (14), and it is designed with the heat exchanger (10) thermally coupled with an oil coolant circuit of the gas-turbine (14).

By incorporating the battery (25) into the power unit (1), the nominal values and dimensions of the heat engine, the electric generators and the associated equipment, can be reduced when designing the power unit, because the heat engine, the electric generators and the associated equipment, does not need to be dimensioned for the expected highest power demand but rather for a mean value. The use of batteries (25) reduce the peak demands of the system, and the batteries can be recharged during valleys or low points in the power demands.

Figure 4:
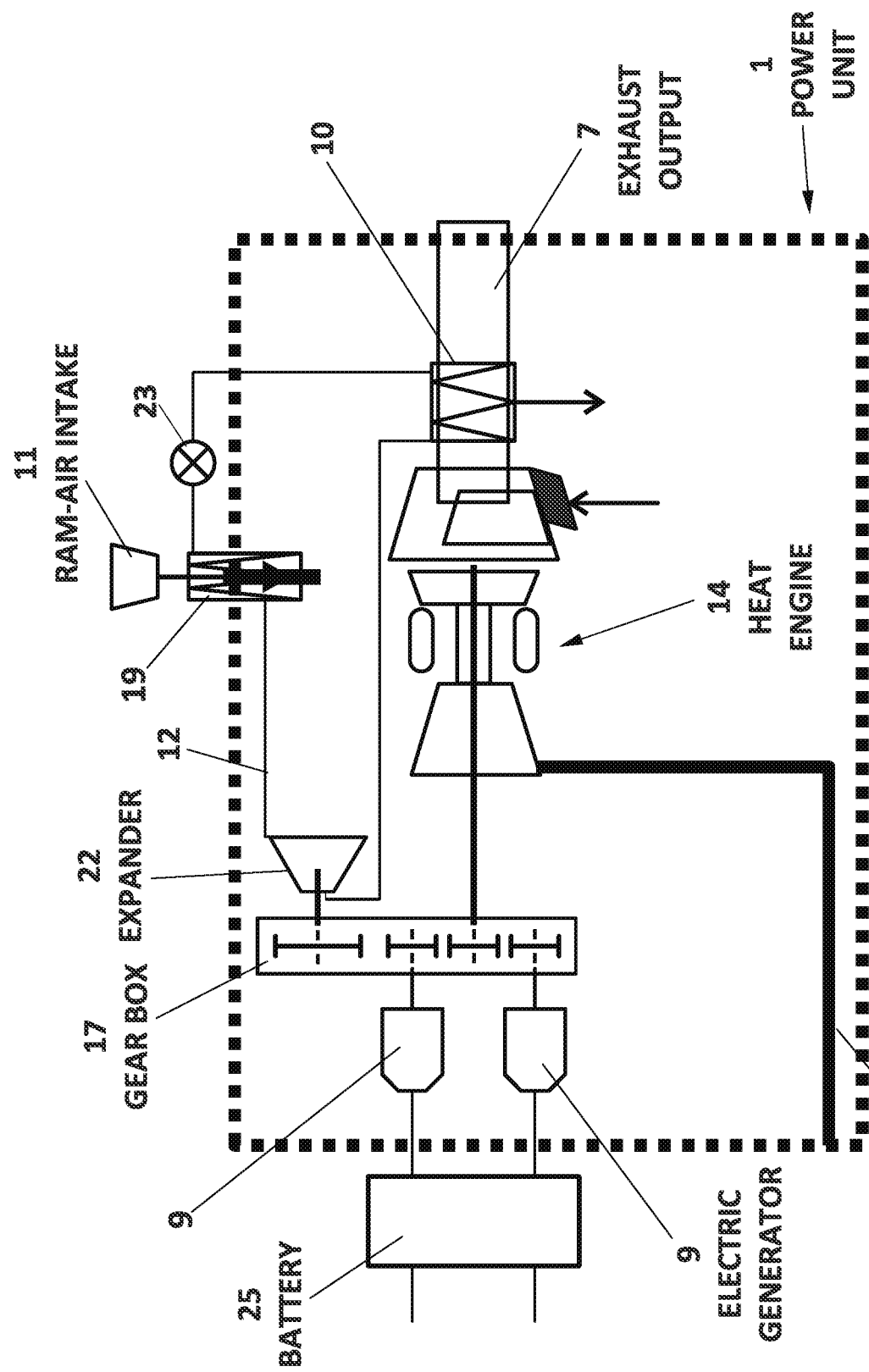
FIG. 4 is a schematic representation of an alternative embodiment of the design shown in FIG. 3.

The embodiment of FIG. 4 is similar to the embodiment of FIG. 3, but the heat of the combustion gases is used as a heat source, and for that the heat exchanger (10) is coupled with the exhaust (7).

Due to the heat recovery Cycle (Rankine cycle), the following advantages are obtained in the present invention:
- the temperature of the bleed air is decreased, so that only the primary heat exchanger is used to achieve the mixer temperature in the ECS pack and bypass the turbomachine in order to reduce high pressure supply and the need for cooling down the cabin air.
- the maximum power from the bleed air is obtained allowing one to downsize the turbo machine. The optimum has to be found in order to balance the heat recovery and the pressure drop that induces more heat during the pressurization.
- the bleed air temperature is lowered in order to replace or remove the detection system. Target is to reduce it below 120-150° C. (TBC).

It is to be noted that the bleed ducting already reduces the temperature along the piping which permits one to get the minimum temperature at the pack interface.

Other requirements of the invention are:
The system should be designed in such a way that permits its installation within the fire compartment and the tailcone.

The working fluid use as a refrigerant in the system should be nonflammable or the system should be designed to satisfy the fire-proof requirements of the fire designated area.

The recuperative turbine must be designed in such a way that it should be a LRU (Line replacement Unit) as well as the other components of the recuperative cycle.

Going back to the embodiments of FIGS. 1 and 2, a control system (not shown) is provided for controlling the operation of the first and second load compressors (3a, 3b) and the first and second three-way valves (6a, 6b), in such a way as to feed a flow of compressed air provided by the twin-compressor (3a, 3b), as bleed air to an environmental control system (ECS) of an aircraft during an entire operation cycle.

The control system is adapted (programmed) to operate in three different modes:

Mode 1—aircraft is parked on the ground.

For this mode, the control system is adapted such that one load compressor is supplying air to the ECS and the other load compressor is not supplying air, and preferably at least one electric generator is working, such that the majority of the bleed air and electric power required by the aircraft, is provided by the power unit. One three-way valve (6a, 6b) is open and the other one is closed. This mode is similar to the conventional use of an APU.

Mode 2—aircraft taxiing, climbing or descending below 25,000 ft.

For this mode, the control system is adapted such that both the first and second load compressors (3a, 3b) are running, so as to provide bleed air at high pressure (around 30-40 psig) so that the condensers can be used. The electric generators could be stopped. Both three-way valves (6a, 6b) are open at the same position. The wings anti-ice system could be powered or supplied either by the power unit or the main engines, and the ECS is running off the power unit.

Mode 3—aircraft in cruise, climbing or descending above 25,000 ft.

For this mode, the control system is adapted such that the first and second compressors (3a, 3b) are running so as to provide bleed air at low pressure (around 12 psig @ ceiling), slightly above the cabin need. The heat exchanger is used to cool down the air according to the mixer needs. Both the ECS's and the electric generators are stopped.

Part of the compressed air goes through the heat exchanger and later on is by-passed through a bypass valve.

The control system may be implemented in many different ways known to a skilled person in the art. Conventionally the control system would comprise one or more programmable electronic devices, multiple sensors and actuators etc. The adaptation of the control system, basically consists in suitable software stored and executed by the programmable electronic devices.

It has been determined that the invention is capable of reducing at least up to 50% of the energy supply, depending on the flight phase, in some cases even more reduction is possible while still being able to provide suitable temperature and pressure to an aircraft cabin.

Figure 5:
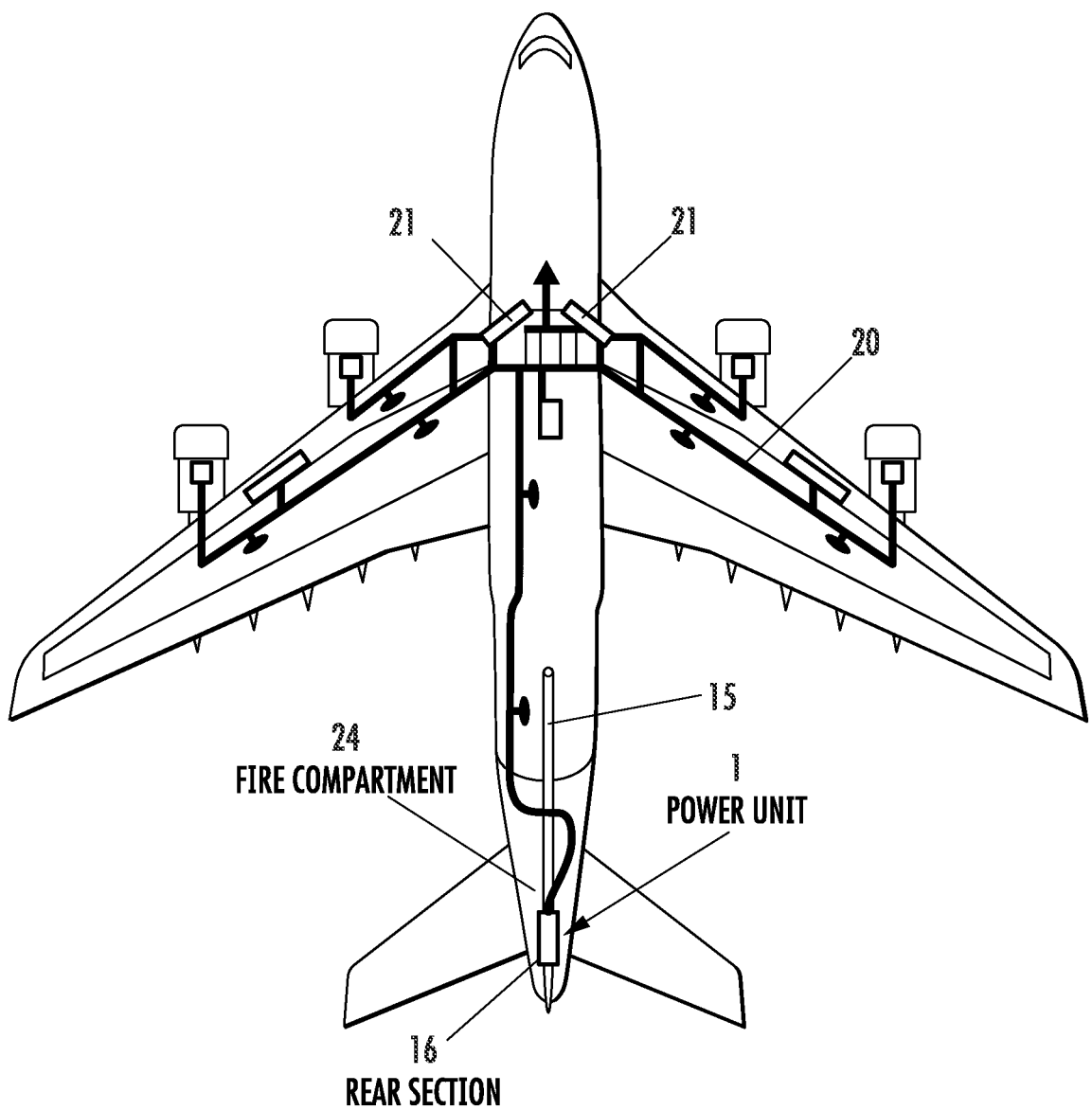
FIG. 5 is a top plan view of a schematic representation of an aircraft showing a preferred location of the power unit, and its connection with the bleed air installation of an aircraft.

It can be noted in FIG. 5, that the power unit (1) of the invention is housed within a fire compartment (24) at a rear section (16) of the aircraft, that is, the power unit (1) can be installed at the same location that a conventional APU would be. Alternatively, the power unit (1) can be installed at another suitable location of the aircraft.

It should be noted that the architecture and design of the aircraft rear section does not need to be modified significantly with respect to installation of a usual APU installation. Components like: fire compartment, intake muffler, electric generators and so on, are substantially the same as in conventional designs.

The power unit (1) is in communication with the bleed system (20) of the aircraft. A conduit (15) is provided for communication between the aircraft cabin and the power unit (1), in particular for feeding cabin air to the heat engine.

The air-conditioning generation units (AGU's) (21) are usually installed at an unpressurized bay in the belly of the aircraft.

We claim:

1. An aircraft having a plurality of main engines and incorporating a power unit (1) adapted to generate electric, pneumatic and/or hydraulic power for the aircraft during all stages of aircraft operation, even when the plurality of main engines are off, wherein the power unit (1) comprises:
    a heat engine (14) having at least one drive shaft (2) and an exhaust (7) for evacuating combustion gases out of the heat engine (14), wherein the heat engine (14) is not one of the plurality of main engines of the aircraft,
    a Rankine cycle system (12) for recovering thermal energy from a heat source found within the power unit (1), as mechanical energy for the assistance of the heat engine (14), and wherein the Rankine cycle system comprises: an expander (22) mechanically coupled with the drive shaft (2) through a gear box (17), at least one electric generator (9) mechanically coupled to the drive shaft (2) through the gear box (17), a first Ram-air intake (11) and a condenser (19) thermally coupled with the first Ram-air intake (11) to cool down a Rankine system fluid, and a heat exchanger (10) thermally coupled with the heat source for transferring heat to the Rankine system fluid and wherein an aircraft cabin is in communication with the heat engine (14) for feeding cabin air to the heat engine (14) as a source of oxygen for combustion by the heat engine (14).

2. The aircraft according to claim 1 wherein the electric generator (9) is driven by the drive shaft (2) for generating electric power.

3. The aircraft according to claim 2 wherein the power unit further comprises at least one battery (25) connected with the electric generator (9) for storing the electric power generated by the electric generator, and wherein the battery (25) is connected to an electric system of the aircraft.

4. The aircraft according to claim 1, wherein the power unit further comprises: at least one load compressor (3) mechanically coupled with the drive shaft (2) to provide a flow of compressed air, a second Ram-air intake (4) in fluid communication with the load compressor (3) to feed Ram air to the load compressor, and wherein the load compressor (3) is in fluid communication with a pneumatic system of the aircraft, to supply the flow of compressed air to the pneumatic system.

5. The aircraft according to claim 4, wherein the pneumatic system of the aircraft is an environmental control system (ECS) of the aircraft.

6. The aircraft according to claim 4, wherein the load compressor (3) is also in fluid communication with the plurality of main engines, to supply the flow of compressed air for starting the plurality of main engines.

7. The aircraft according to claim 1, wherein the heat exchanger (10) of the Rankine cycle system (12) is thermally coupled with the exhaust of heat engine, so that that the combustion gases of the heat engine are used as the heat source for the Rankine cycle system (12).

8. The aircraft according to claim 4, wherein the heat exchanger (10) of the Rankine cycle system (12) is thermally coupled with an output of the load compressor (3), so that the flow of compressed air provided by the load compressor (3) is used as the heat source for the Rankine cycle system (12).

9. The aircraft according to claim 1, wherein the heat exchanger (10) of the Rankine cycle system (12) is thermally coupled with an oil coolant circuit of the heat engine (14), so that the oil coolant circuit is used as the heat source for the Rankine cycle system (12).

10. The aircraft according to claim 5, wherein the at least one load compressor (3) is a twin load compressor including a first and a second load compressor (3a, 3b), each of the first and second load compressors having an output and being mechanically coupled with the drive shaft (2) to provide the flow of compressed air, and wherein first flow regulating means (6) are provided at each of the outputs of the first and second load compressors (3a, 3b), and wherein the outputs of the first and second load compressors (3a, 3b) are in fluid communication with the environmental control system (ECS) of the aircraft.

11. The aircraft according to claim 10, wherein the power unit (1) further comprises a control system adapted for controlling operation of the first and second load compressors (3a, 3b), and wherein the control system is adapted to feed the flow of compressed air to the environmental control system (ECS) of the aircraft.

12. The aircraft according to claim 11, wherein the control system is adapted such that when the aircraft is parked, one of the first load compressor or the second load compressor is configured to supply air to the environmental control system (ECS) and the other of the first or the second load compressor is configured not to supply air to the environmental control system, and the electric generator is configured to supply electric power to the aircraft.

13. The aircraft according to claim 11, wherein the control system is additionally adapted such that when the aircraft is taxiing, climbing or descending below a predefined height, the first and second load compressors are configured to operate and supply air at or above a first predefined pressure.

14. The aircraft according to claim 10, further comprising a second flow regulating means comprising inlet guide vanes for each of the first and the second load compressors (3a, 3b), to regulate individually air flow into each of the first and the second load compressors.

15. The aircraft according to claim 1, wherein the heat engine is one of a gas-turbine engine or a reciprocating engine.

* * * * *